(12) United States Patent
Sapir

(10) Patent No.: US 6,310,545 B1
(45) Date of Patent: Oct. 30, 2001

(54) BRAKE MONITORING SYSTEM AND METHOD

(75) Inventor: Abraham Sapir, Ishchar (IL)

(73) Assignee: Opgal Optronic Industries Ltd., Marmiel (IL)

( * ) Notice: Subject to any disclaimer, the term of this patent is extended or adjusted under 35 U.S.C. 154(b) by 0 days.

(21) Appl. No.: 09/345,748

(22) Filed: Jul. 1, 1999

Related U.S. Application Data

(63) Continuation-in-part of application No. PCT/IL97/00439, filed on Dec. 30, 1997.

(30) Foreign Application Priority Data

Jan. 1, 1997 (IL) .......................................... 119956

(51) Int. Cl.[7] .................................................. B60Q 1/00
(52) U.S. Cl. ...................... 340/453; 340/454; 188/1.11 R
(58) Field of Search ..................................... 340/453, 449, 340/454; 188/1.11 R

(56) References Cited

U.S. PATENT DOCUMENTS

| | | | |
|---|---|---|---|
| 3,691,523 | 9/1972 | Helms et al. .................. | 340/447 |
| 4,569,600 | 2/1986 | Preniczny et al. . | |
| 4,649,370 | 3/1987 | Thomason . | |
| 4,820,057 | 4/1989 | Berndt . | |
| 4,887,229 | 12/1989 | Weiss . | |
| 5,235,399 | 8/1993 | Usui et al. . | |
| 5,246,292 | 9/1993 | Gal et al. . | |
| 5,302,940 | 4/1994 | Chen . | |
| 5,335,995 | 8/1994 | Villar . | |
| 5,478,151 | 12/1995 | Dührkoop . | |
| 5,581,464 | * 12/1996 | Woll et al. .................... | 364/424.04 |
| 5,959,365 | * 9/1999 | Mantini et al. ................ | 307/10.1 |

FOREIGN PATENT DOCUMENTS

| | | |
|---|---|---|
| 36 43 047 A | 6/1988 | (DE) . |
| 38 13 514 A | 11/1989 | (DE) . |
| 41 03 917 A | 8/1992 | (DE) . |
| 43 19 996 A | 12/1994 | (DE) . |
| 0 777 063 A | 6/1997 | (EP) . |
| 1 548 535 A | 12/1968 | (FR) . |
| 2 258 508 A | 1/1993 | (GB) . |
| 62 200041 A | 2/1988 | (JP) . |
| 01 036564 A | 5/1989 | (JP) . |
| WO 84 00406 A | 2/1984 | (WO) . |

* cited by examiner

*Primary Examiner*—Edward Lefkowitz
(74) *Attorney, Agent, or Firm*—Eitan, Pearl, Latzer & Cohen-Zedek

(57) ABSTRACT

A brake monitoring system (10) having at least one brake temperature detection unit (10) externally attached to one of the brake assemblies (12) of a vehicle is provided. The brake temperature detection unit (10) includes at least one sensor (30) for detection radiation from the corresponding brake assembly (12) and a processing unit (32) coupled to the sensor (30) for determining the temperature of the corresponding brake assembly (12) from the detected radiation.

28 Claims, 6 Drawing Sheets

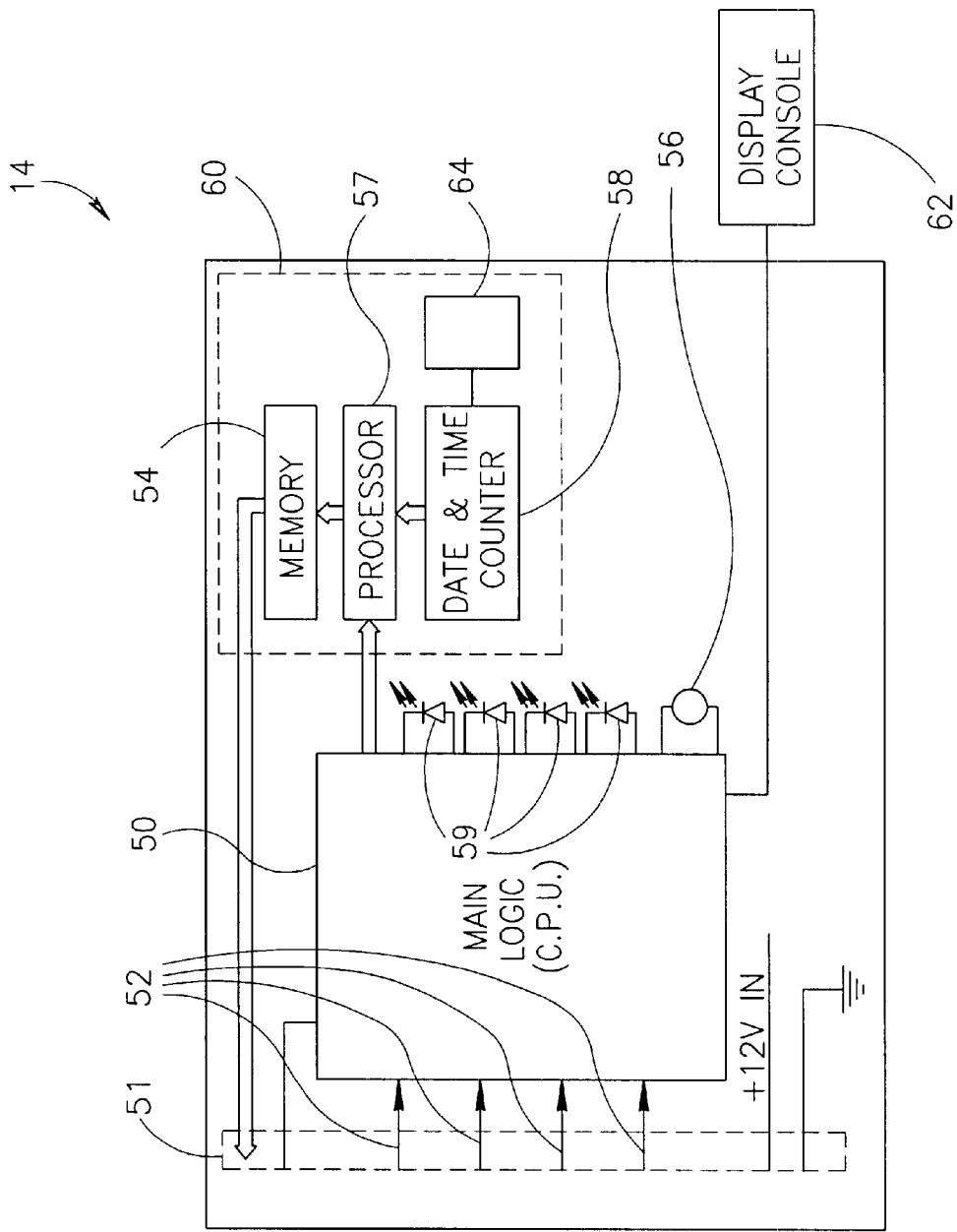
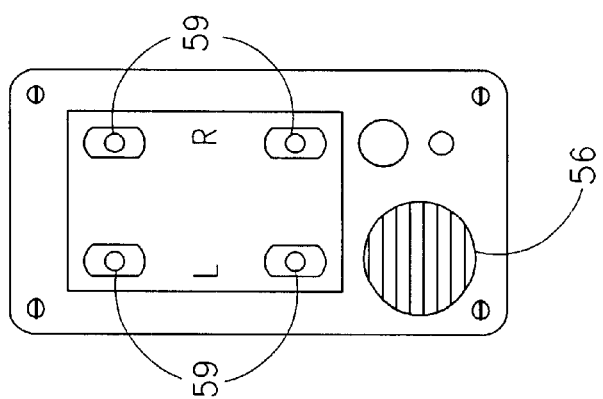
FIG.5A
FIG.5B

BRAKE MONITORING SYSTEM AND METHOD

This is a continuation-in-part application of pending prior international application Number PCT/IL97/0039, filed on Dec. 30, 1997 entitled BRAKE MONITORING SYSTEM AND METHOD, which designated the United States.

FIELD OF THE INVENTION

The present invention relates to motor vehicle braking systems generally and more particularly to the detection of overheating of brakes, especially of trucks and other heavy vehicles.

BACKGROUND OF THE INVENTION

Motor vehicles and especially trucks, trailers, buses and other heavy vehicles are subject to intensive use of their brakes. It is common practice for truck drivers to overuse their brakes. For example, when traveling downhill, drivers are apt to continually press the brake pedal instead of selecting a lower gear for braking to slow their vehicle. Continuous friction between the brake pad and its drum causes overheating which leads to a loss of efficiency in the braking system. Ultimately, overheating may lead to a partial or complete braking failure and subsequently to a major and fatal road accident.

Heavy vehicles are disproportionately responsible for road accidents. Among these road accidents a significant proportion are due to faulty or incorrect use of the vehicle's brakes. "Brake" accidents may be minimized by early detection and notification to the driver of any abnormal or dangerous situation, such as overheating. Furthermore, driving habits can be improved by tracking and monitoring a driver's braking performance.

Numerous brake detectors and systems for the surveillance of brakes are known. For example, U.S. Pat. No. 4,649,370 to Thompson describes a brake condition indicator which is attachable to a conventional brake shoe. U.S. Pat. No. 5,302,040 to Chen describes a motor vehicle brake detector which is fastened in the brake shoe and includes a blind hole formed in the brake shoe.

U.S. Pat. No. 4,820,057 to Berndt describes a method and apparatus for contactless measuring of the brake temperature of passing railroad cars by fixing sensor apparatus to the rail track to scan the passing wheels.

For maximum efficiency, such stationary detection equipment needs to be placed at regular intervals. Unfortunately, a high percentage of rail vehicles are missed and axle-journal breakages constantly recur.

The known prior art devices require modification of existing braking systems. Such modification tends to be costly and impractical for large vehicle fleets. Additionally, prior art devices are difficult to replace and maintain and are detrimentally affected by oil and dirt.

SUMMARY OF THE INVENTION

An object of the present invention is to provide a brake temperature detection unit which overcomes the limitations and disadvantages of prior art units.

A further object of the present invention is to provide a brake temperature detection unit which is easily and quickly installed.

A yet further object of the present invention is to provide a brake temperature detection unit which does not require major modifications to the vehicle.

A yet further object of the present invention is to provide a brake temperature detection unit which uses radiation sensors.

A yet further object of the present invention is to provide a brake temperature detection unit which is automatically cleaned.

There is thus provided, in accordance with a preferred embodiment of the present invention, a brake monitoring system having at least one brake temperature detection unit externally attached to one of the brake assemblies of a vehicle. The brake temperature detection unit includes at least one sensor for detecting radiation from the corresponding brake assembly.

Additionally, in accordance with a preferred embodiment of the present invention, there is provided a brake temperature detection unit externally attached to one of the brake assemblies of a vehicle. The brake temperature detection unit includes at least one sensor for detecting radiation from the corresponding brake assembly and a processing unit coupled to the sensor for determining the temperature of the corresponding brake assembly from the detected radiation.

Furthermore, in accordance with a preferred embodiment of the present invention, the system further includes a processing unit for determining the temperature of the corresponding brake assembly from the detected radiation. The processing unit is coupled to each of the brake temperature detection units.

Furthermore, in accordance with a preferred embodiment of the present invention, the system further includes control apparatus coupled to the brake temperature detection unit and to the a processing unit.

Furthermore, in accordance with a preferred embodiment of the present invention, upon the recorded temperature of the corresponding brake assembly exceeding a pre-determined level, the control apparatus causes the vehicle to be brought to a halt.

Furthermore, in accordance with a preferred embodiment of the present invention, the control apparatus includes means for indicating to the driver of the vehicle whenever the recorded temperature of the corresponding brake assembly exceeds a pre-determined level. The indication includes an audible alarm or at least one LED light corresponding to each of the at least one brake temperature detection units.

Furthermore, in accordance with a preferred embodiment of the present invention, the brake temperature detection unit further includes a housing having an aperture formed in one side thereof. The brake temperature detection unit is fitted to the vehicle brake assembly so that the aperture is in alignment with the brakes of the vehicle brake assembly and the sensor.

Additionally, in accordance with a preferred embodiment of the present invention, the brake temperature detection unit further includes a heat source and a second sensor coupled to the heat source.

Furthermore, in accordance with a preferred embodiment of the present invention, the brake temperature detection unit also includes a mirror shutter unit pivotally fitted to the brake temperature detection unit, whereby the mirror shutter unit is movable from a first position wherein the mirror shutter unit sealingly closes the aperture to a second position wherein the mirror shutter unit reflects radiation from the heat source.

Furthermore, in accordance with a preferred embodiment of the present invention, the mirror shutter unit is operable by means of an electromagnet attached to the mirror.

Additionally, in accordance with a preferred embodiment of the present invention, the brake temperature detection unit also includes filtration means.

Furthermore, in accordance with a preferred embodiment of the present invention, the control apparatus includes a black box device. The black box device includes a memory storage device coupled to the a processing unit, a processor connected to the memory storage device and a recording device connected to the processor.

Additionally, in accordance with a preferred embodiment of the present invention, there is provided a method for detecting an increase in temperature in a vehicle brake assembly having a brake temperature detection unit fitted thereto. The method includes the steps of:

a) determining the ambient temperature of the detecting unit;

b) determining the temperature of a heat source within the detecting unit, the detecting unit being sealed from any radiation from the brake assembly;

c) recording the temperature of the brake assembly;

d) comparing the recorded brake assembly temperature with the determined heat source temperature; and e) indicating an alarm if the recorded brake assembly temperature exceeds a pro determined temperature.

Furthermore, in accordance with a preferred embodiment of the present invention, the pre-determined temperature is equal to the determined heat source temperature.

BRIEF DESCRIPTION OF THE DRAWINGS

The present invention will be understood and appreciated more fully from the following detailed description taken in conjunction with the appended drawings in which:

FIG. 5A is a schematic arrangement of a control box operable with a brake temperature detection unit of FIGS. 1 and 4;

FIG. 5B is a front elevational view of the control box of FIG. 5A;

DETAILED DESCRIPTION OF THE PRESENT INVENTION

Figure 1:
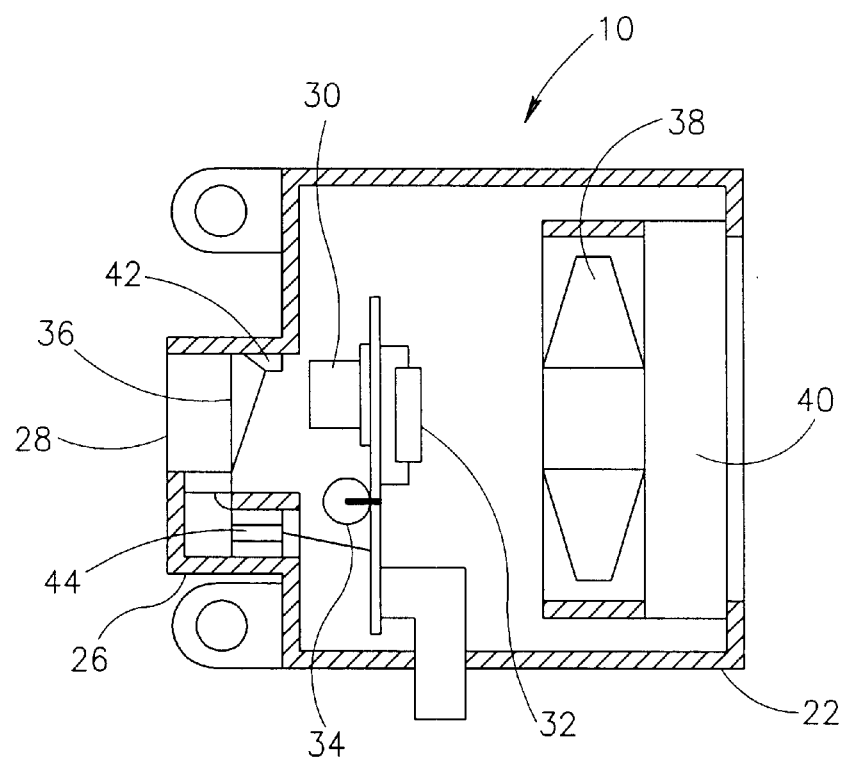
FIG. 1 is a sectional elevation of a brake temperature detection unit, constructed and operative in accordance with a preferred embodiment of the present invention.
Figure 2:
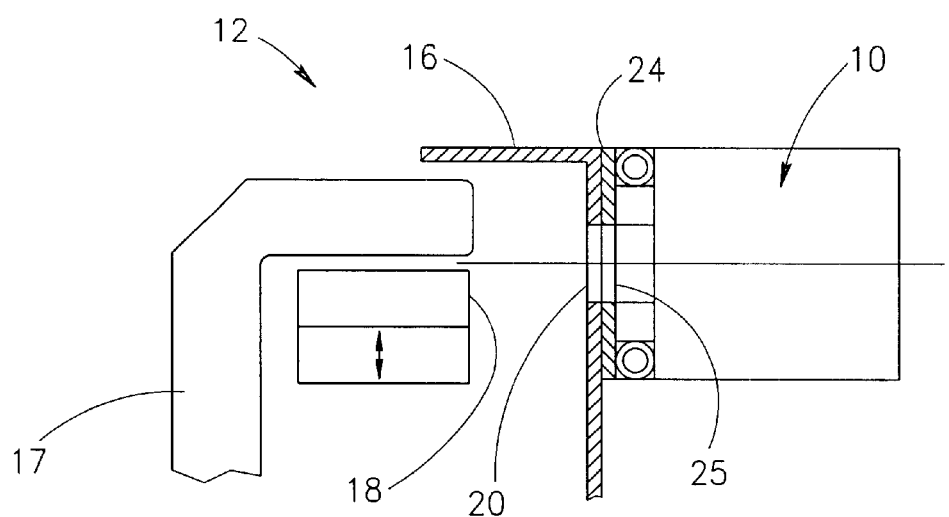
FIG. 2 is a schematic illustration of the brake temperature detection unit of FIG. 1, fitted to a vehicle.
Figure 3:
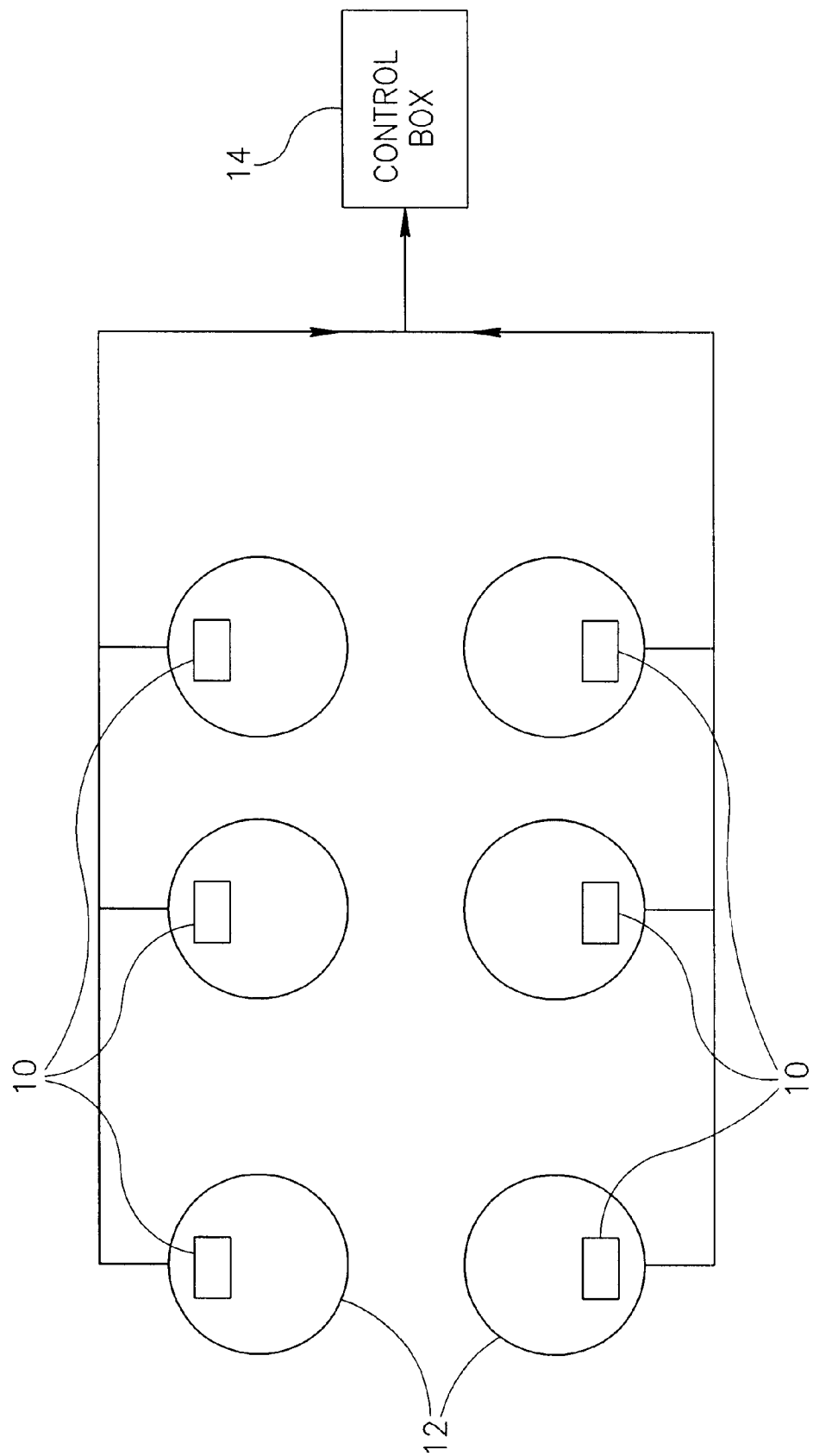
FIG. 3 is a schematic illustration of a typical 6-wheeled vehicle having a temperature detection unit of FIG. 1, fitted to each brake assembly.

Reference is now made to FIGS. 1, 2 and 3. FIG. 1 is a sectional elevation of a brake temperature detection unit, generally referenced 10, constructed and operative according to a preferred embodiment of the present invention. FIG. 2 illustrates brake temperature detection unit 10 fitted to a standard brake assembly, generally designated 12, of a vehicle. The brake temperature detection unit 10 is fitted to the standard brake assembly 12 to detect changes in the temperature of the brake assembly 12. In a typical arrangement, illustrated in FIG. 3 and constructed and operative according to a preferred embodiment of the present invention, a separate detection unit 10 is fitted to each of the brake assemblies of a 6-wheeled vehicle. Each of the detection units 10 are coupled to a central control box 14, which is preferably located within the vehicle driver's cab for ease of access and display.

Brake assembly 12 is any standard braking unit fitted to vehicles and comprises a brake cover 16 enclosing a brake drum 17 and brake pads 18. The brake covers of standard brake assemblies generally have an opening, referenced 20, formed therein, which allows the brake pads 18 to be viewed without the necessity of removing the cover 16. The present applicants have realized that the temperature within the brake assembly 12 can be monitored by attaching a detection unit which surrounds the brake drum opening 20.

Brake temperature detection unit 10 comprises a housing 22 and an adaptor 24. Housing 22 comprises a generally box-like structure having a projecting element 26, protruding from one side thereof. An aperture 28 is formed within projecting element 26.

Adapter 24 is bolted, or otherwise suitably fitted, to brake cover 16. The housing 22 of brake temperature detection unit 10 is suitably attached to adapter 24.

A second opening 25 is formed in adaptor 24. Second opening 25 has generally similar dimensions to opening 20 in brake cover 16 and to aperture 28 of housing 22. Brake temperature detection unit 10 is fitted to brake cover 16 via adapter 24 so that opening 20, aperture 28 and second opening 25 are aligned. Thus, radiation has unimpeded access to housing 22.

Brake temperature detection limit 10 further comprises a sensor 30 attached to a central processing unit (CPU) 32, at least one heat source 34, a mirror shutter 36, a fan 38 and at least one air filter unit 40.

Sensor 30 is any suitable sensor capable of recognizing changes in temperature, such as infra-red (IR) sensors. Sensor 30 is located, within the projecting element 26 of housing 22, directly opposite aperture 28 in order to be able to perceive temperature changes occurring due to the application of the vehicle's brakes.

CPU 32 is any known in the art processor which is also coupled to heat source 34 and fan 38.

Heat source 34 is any suitable heat element preferably coupled to a the thermistor 35 (FIG. 4) or similar resistor. Heat source 34 provides a pre-determined reference temperature for sensor 30.

Mirror shutter 36 is pivotally fitted to one corner 42 of projecting element 26. In the preferred embodiment of FIG. 2, detection unit 10 further comprises an electromagnet 44 (FIG. 1) which is coupled to CPU 32. Mirror shutter 36 is operated by means of electromagnet 44 to open and close aperture 28. Mirror shutter 36 acts in a manner similar to a shutter device in a camera, that is, it can be opened to allow radiation to enter housing 22. When in its default inactive and closed position mirror shutter 36 seals the unit 10 and prevents any radiation from entering the unit 10.

Fan 38 is any suitable fan for providing circulation and cooling within housing 22. Air filter 40, which is any suitable filter for filtering the air and preventing dust from entering housing 22, is located at the far end of housing 22, distal from sensor 30. Thus, continuously filtered air (via air filter 40) circulates through housing 22 and exits via aperture 28.

Figure 4:
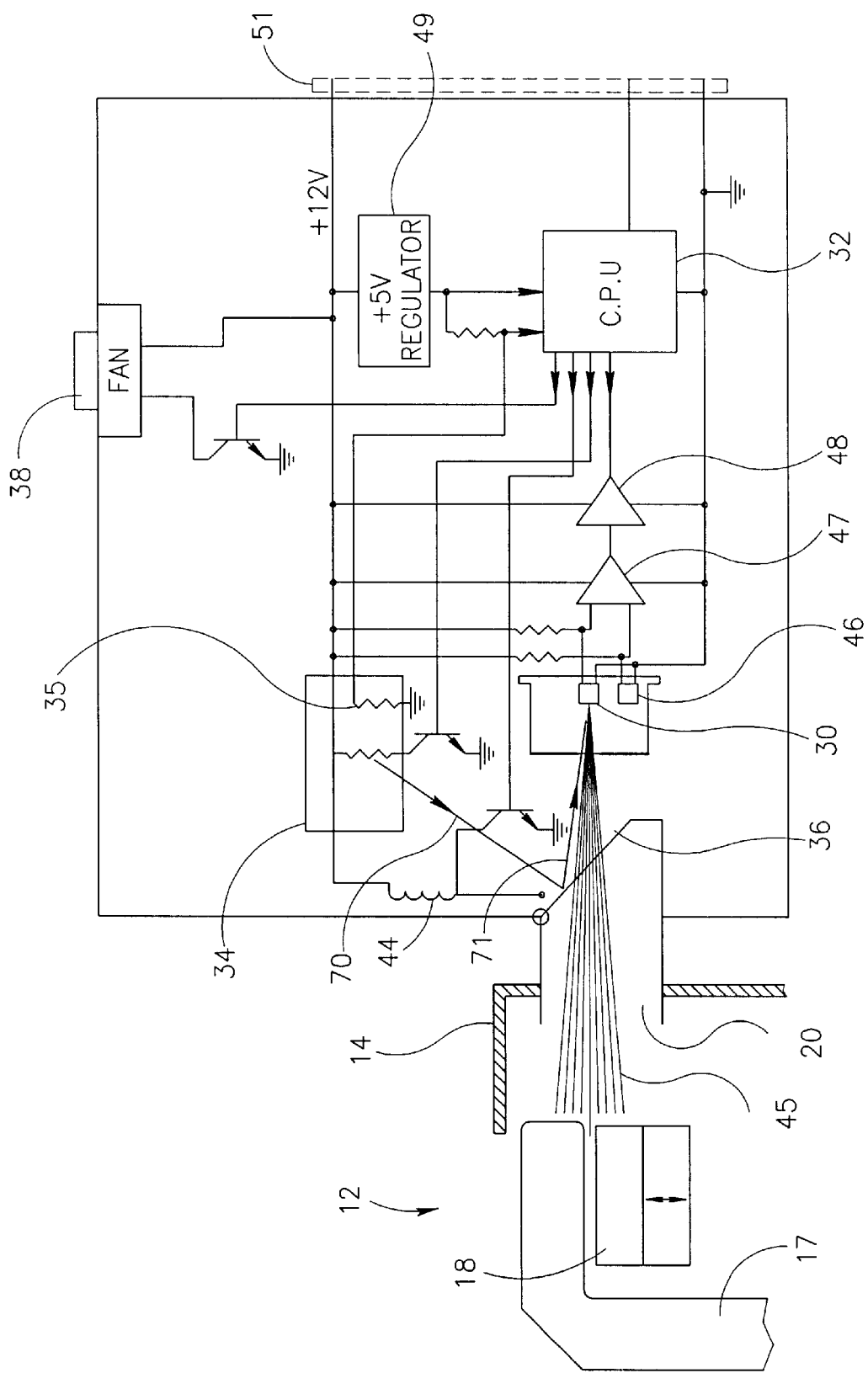
FIG. 4 is a schematic block diagram illustration of the electronic and mechanical components of a brake temperature detection unit constructed and operative according to a preferred embodiment of the invention.

Reference is now also made briefly to FIG. 4, which is a schematic block diagram illustration of the electronic and mechanical components of a preferred embodiment of detection unit 10 utilizing a second sensor 46. Detection unit 10 further comprises a differential amplifier 47, an amplifier 48 and a voltage regulator 49, all of which components are suitably coupled to CPU 32. Differential amplifier 47, amplifier 48 and voltage regulator 49 are standard known in the art devices.

Second sensor 46, which is similar to sensor 30, is located adjacent to sensor 30. Sensor 30 lies in direct line of radiation (indicated by rays 45), produced by heat generated from the brakes 18. Sensor 46, which is covered up so as not to be exposed to any external radiation, records the temperature of the thermistor 35 of heat source 34. Thus, the temperature recorded by sensor 46 provides a reference reading. Differential amplifier 47 which is coupled to both sensors 30 and 46, amplifies the difference in temperature readings recorded by each of tho first and second sensors 30 and 46, respectively. The resulting reading is further amplified by amplifier 48 and the analog signal converted to digital format for processing by CPU 32.

Voltage regulator 49 is used to reduce the input from the main connection 51, which preferably is a standard 12V vehicle battery, to 5V which is required to operate detection unit 10.

Figure 8:
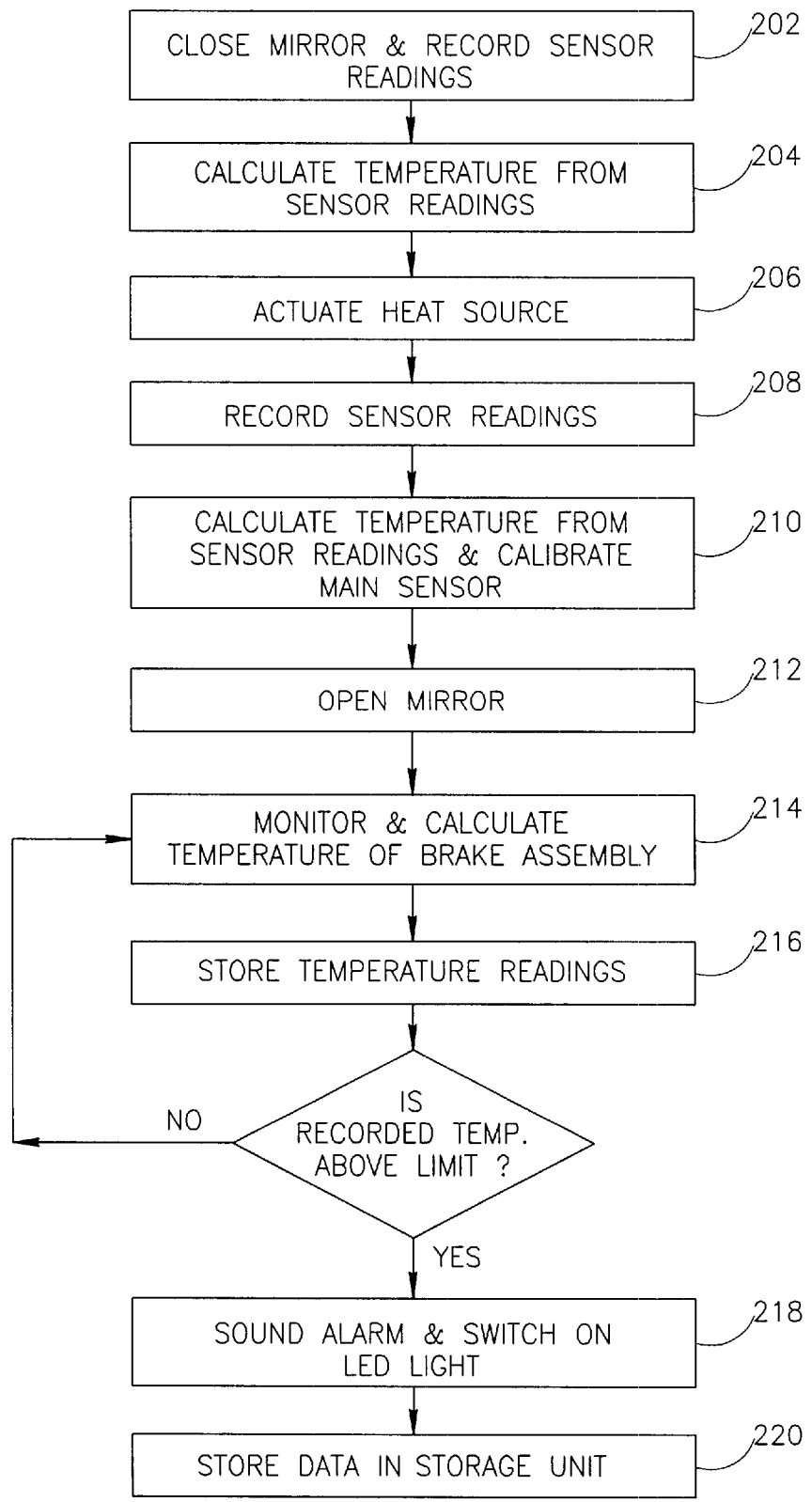
FIG. 8 is a flow chart illustration of the operation of brake temperature detection unit.

Reference is also now made to FIG. 8, which is a flow chart illustration of the operation of brake temperature detection unit 10. Mirror 36 is closed (its default state) and the voltage resistance (say v1$s$ and v1$h$) are recorded by sensors 30 and 45, respectively (stop 202). The suffix "s" refers to sensor 30 and the suffix "h" refers to sensor 46. The ray (referenced 70) produced by heat source 34, is reflected by mirror 36 and the reflected ray (referenced 71) is detected by first sensor 30. Sensor 46 directly records the voltage of thermistor 35. When the mirror is closed, and there is not any IR radiation entering housing 22, the readings from sensors 30 and 46 may be similar and thus, the difference recorded by differential amplifier 47 should be close to zero. The temperatures (say t1$s$ and t1$h$) corresponding to the sensor readings 30 and 46, respectively, are calculated (by CPU 32) from the voltage readings (step 204). Temperatures t1$s$ and t1$h$ vary and are dependent on the ambient temperature within the unit 10. The sensitivity of sensor 30 depends on the ambient temperature.

Heat source 34 is actuated to generate heat (step 206) and the voltages (say v2$s$ and v2$h$) are recorded by sensors 30 and 46, respectively (step 208). The corresponding temperatures (say t2 and t2$h$) are then calculated (step 210). Since the temperature (t2$t$) of heat source 34 is known, it can be used to calibrate the sensor 30. For example, if heat source 34 generates a temperature of 100° C. and sensor 30 records a temperature equivalent to 96° C. then all readings by sensor 30 can be adjusted accordingly.

Mirror 36 is actuated to its open position by means of electromagnet 44 (step 212). The temperature of the brake assembly 12 is constantly monitored by sensor 30 and processed by CPU 32 (step 214). The difference in the IR readings from sensors 30 and 46 increases according to the increase of external IR radiation. The differential data is amplified (by amplifiers 47 and 48) and after processing by CPU 32 is output to control box 14 where the data is stored (step 216). If the temperature of any of the brake units exceeds the pre-determined maximum (which may be equal to the recorded heat source temperature), an alarm is indicated to the driver (step 218). The alarms may be audible or visual. The data is also stored in the "black box" storage unit (step 220).

Each of the detection units 10 can be independently operated and monitored in a preferred mode of operation, all of the detection units 10 work simultaneously transmitting data to the control box 14.

Reference is now made briefly to FIGS. 5A and 5B, FIG. 5A is a schematic arrangement of control box 14 and FIG. 5B is a front elevational view of control box 14. Control box 14 comprises a main processor 50 to which is coupled the data input connections, referenced 52, from each of the detection units 10 fitted to the vehicle's brake assemblies. Control box 14 further comprises a memory storage device 54, an alarm indicator 56, a processor 57 and preferably a date and time recording device 58, all of which component are coupled to main processor 50.

The memory storage device 54, processor 57 and recording device 58 components are preferably comprised within a "black box" device 60 (shown by dashed lines). Optionally, a display console 62 is coupled to main processor 50. Preferably, a backup battery 64 is also coupled to the processor 50 to ensure continuous power supply in the event that the vehicles' main battery is inoperable.

Main processor 50 and the various components of the control box 14 are standard, known in the art components. The alarm indicator 56 is any suitable audible indicator, such as, a buzzer which can appraise the driver of the increase in brake temperature due to over-heating or brake failure . . . , Additionally, a plurality of LED lights 59, one for each detection unit 10, indicate whenever the brake temperature exceeds a safe figure in order to give the driver advance warning or potential failure. Alternatively, different LED lights of different colors or different sounding alarms may be used to indicate gradually increasing brake temperatures.

The "black box" device 60 is a known sealed storage device for storing and maintaining records and is capable of withstanding extreme environmental conditions. The data stored within black box 60 can be used for investigative purposes, for example, to determine events loading up to a fatal accident.

The control box 14 is preferably connected to the vehicle's ignition and braking system so that in the event of excessive temperatures being recorded or a brake failure detected, the vehicle can be brought to a halt and rendered inoperable until the cause of the failure is corrected.

Figures 6A, 6B:
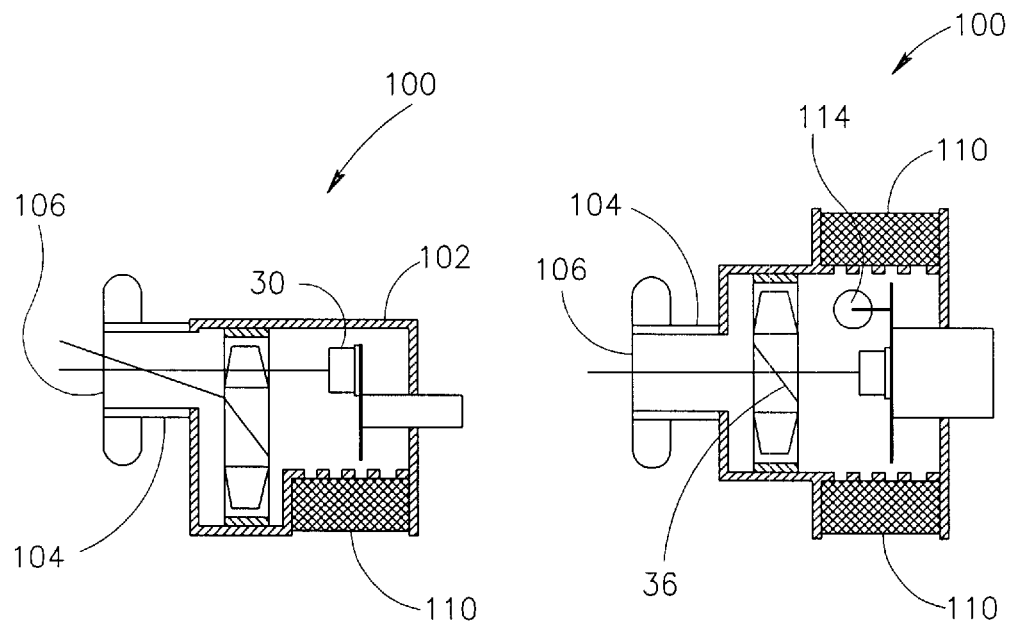
FIGS. 6A and 6B are side and plan elevational views, respectively of a brake temperature detection unit, constructed and operative according to further preferred embodiment of the invention.
Figure 7:
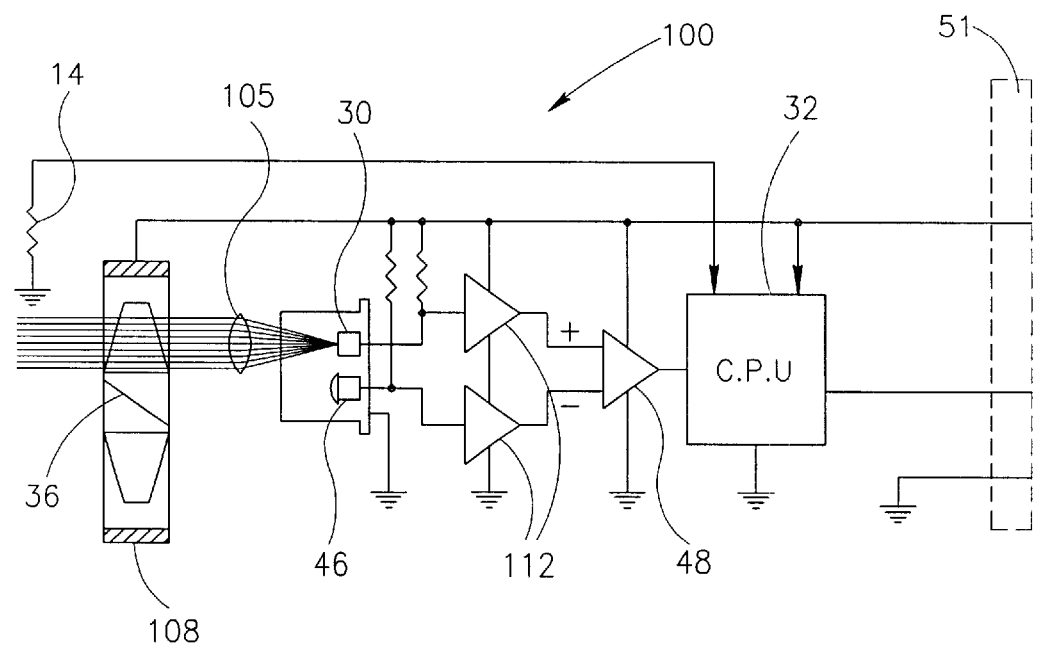
FIG.7 is a schematic block diagram illustration of the electronic and mechanical components of the brake temperature detection unit of FIGS. 6A and 6B.

Reference is now made to FIGS. 6A, 6B and 7. FIGS. 6A and 6B are side and plan elevational views, respectively, of a brake temperature detection unit, generally referenced 100, constructed and operative according to a further preferred embodiment of the invention. FIG. 7 is a schematic block diagram illustration of the electronic and mechanical components of a brake temperature detection unit 100.

Elements of this embodiment of the invention which are similar to elements which have been previously described with respect to the preferred embodiment hereinabove, are similarly designated and will not be further described.

Brake temperature detection unit 100 comprises a housing 102 and an adapter (not shown) similar to adapter 24 (FIG. 2). Housing 102 is similar to housing 22 and comprises a generally box-like structure having a projecting element 104, protruding from one side thereof. An aperture 106 is formed within projecting element 104.

Brake temperature detection unit 100 is fitted to brake cover 16 via adapter 24 so that aperture 106 is aligned with the opening (20) in brake cover 16.

Brake temperature detection unit 100 comprises first and second sensors sensor 30 and 46, respectively, a mirror 36, a lens 105, fan 108, first and second filter units 110, first and second amplifiers 112, a heat source 114 and a third amplifier 48. All of these components are suitably coupled to CPU 32.

Sensors 30 and 46, which preferably are infra-red (IR) sensors, are located within housing 102 so that sensor 30 is directly opposite aperture 106, in order to be able to perceive temperature changes occurring in the brake assembly 12 (FIG. 2). Lens 105 concentrates the radiation form the brakes onto sensor 30.

In this embodiment, aperture 106 is continuously open to the elements. An electromagnet is not used to open and close the mirror so as to occasionally seal the housing 102. In order to compensate for the increased amount of air and dust likely to enter aperture 106, filter units 110 are placed on either side of sensors 30 and 46. Fan 108 is located proximate to mirror shutter 36 to keep it clear of dust and dirt.

It will be appreciated by persons skilled in the art that any suitable method of attaching housing 22 (or 102) to adapter 24 may be used. In accordance with a prefeered embodiment of the invention, the method of attachment preferably allows detection unit 10 to be removed for maintenance. For example, housing 22 (or 102) may comprise a spring-loaded device having clips which can hook onto and encompass matching clips formed on adapter 24.

It will be appreciated that the present invention is not limited by what has been described hereinabove and that numerous modifications, all of which fall within the scope of the present invention, exist. For example, while the present invention has been described with respect to the use of double IR sensors, the temperature of a vehicles braking system may be detected using any combination of suitable sensors.

Furthermore, it will be appreciated that there are numerous alternative methods of keeping the mirror and sensors clean. For example, a wiper system, similar to that employed for cleaning vehicle windscreens or headlights, can be attached to the brake temperature detection unit. Alternatively, an air pressure system can be attached to keep the mirror and sensors clean.

It will be appreciated by persons skilled in the art that the present invention is not limited to motor vehicles and may be adapted for use in other modes of transportation, especially railroads and airplanes. For example, the detection units may be fitted to railroad car brakes, wheels, tires and axle bearings. By means of a suitably configured control panel, a locomotive driver could be kept appraised of all the relevant railroad components which are subject to overheating and damage.

It will be appreciated by persons skilled in the art that the present invention is not limited by what has been particularly shown and described hereinabove. Rather the scope of the invention is defined by the claims which follow:

What is claimed is:

1. A brake monitoring system comprising:
    at least one brake temperature detection unit externally attached to one of the brake assemblies of a vehicle, said brake temperature detection unit comprising:
        least one sensor for detecting radiation from said corresponding brake assembly; and
        a mirror shutter unit pivotally fitted to said brake temperature detection unit.

2. A system according to claim 1 and further comprising a processing unit for determining the temperature of said corresponding brake assembly from said detected radiation, said a processing unit coupled to each of said at least one brake temperature detection unit.

3. A system according to claim 1 and wherein said at least one brake temperature detection unit further comprises a housing having an aperture formed in one side thereof, wherein said at least one brake temperature detection unit is fitted to said vehicle brake assembly so that said aperture is in alignment with the brakes of said vehicle brake assembly and said at least one sensor.

4. A system according to claim 1 and wherein said at least one brake temperature detection unit further comprises:
    a) a heat source; and
    b) a second sensor coupled to said heat source.

5. A system according to claim 4 and wherein said at least one brake temperature detection unit further comprises a mirror shutter unit pivotally fitted to said brake temperature detection unit, whereby said mirror shutter unit is movable from a first position wherein said mirror shutter unit sealingly closes said aperture to a second position wherein said mirror shutter unit reflects radiation from said heat source.

6. A system according to claim 1 and wherein said mirror shutter unit is operable by means of an electromagnet attached to said mirror.

7. A system according to claim 1 and wherein said at least one brake temperature detection unit further comprises filtration means.

8. A system according to claim 2 and further comprising control apparatus coupled to said at least one brake temperature detection unit and to said a processing unit.

9. A system according to claim 8 and wherein, upon the recorded temperature of said corresponding brake assembly exceeding a pre-determined level, said control apparatus causes said vehicle to be brought to a halt.

10. A system according to claim 8 and wherein said control apparatus comprises means for indicating to the driver of said vehicle whenever the recorded temperature of said corresponding brake assembly exceeds a pre-determined level.

11. A system according to claim 10 and wherein said indicating means comprises an audible alarm.

12. A system according to claim 10 and wherein said indicating means comprises at least one LED light corresponding to each of said at least one brake temperature detection units.

13. A system according to claim 8 and wherein said control apparatus further comprises a black box device, said black box device comprising:
    a) a memory storage device coupled to said a processing unit;
    b) a processor connected to said memory storage device; and
    c) a recording device connected to said processor.

14. A system according to claim 1 and further comprising a cleaning unit attached to said brake temperature detection unit.

15. A brake temperature detection unit externally attached to one of the brake assemblies of a vehicle, said brake temperature detection unit comprising:
    at least one sensor for detecting radiation from said corresponding brake assembly;
    a processing unit coupled to said at least one sensor for determining the temperature of said corresponding brake assembly from said detected radiation; and a mirror shutter unit pivotally fitted to said brake temperature detection unit.

16. A brake temperature detection unit according to claim 15 and further comprising a housing having an aperture formed in one side thereof, wherein said at least one brake temperature detection unit is fitted to said vehicle brake assembly so that said aperture is in alignment with the brakes of said vehicle brake assembly and said at least one sensor.

17. A brake temperature detection unit according to claim 15 and further comprising:
   a) a heat source; and
   b) a second sensor coupled to said heat source.

18. A brake temperature detection unit according to claim 17 and wherein and further comprising a mirror shutter unit pivotally fitted to said brake temperature detection unit, whereby said mirror shutter unit is movable from a first position wherein said mirror shutter unit sealingly closes said aperture to a second position wherein said mirror shutter unit reflects radiation from said heat source.

19. A brake temperature detection unit according to claim 15 and wherein said mirror shutter unit is operable by means of an electromagnet attached to said mirror.

20. A brake temperature detection unit according to claim 15 and further comprising filtration means.

21. A brake temperature detection unit according to claim 15 and further comprising control apparatus coupled to said a processing unit.

22. A brake temperature detection unit according to claim 21 and wherein said control apparatus comprises means for indicating to the driver of said vehicle whenever the recorded temperature of said corresponding brake assembly exceeds a pre-determined level.

23. A brake temperature detection unit according to claim 22 and wherein said indicating means comprises an audible alarm.

24. A brake temperature detection unit according to claim 22 and wherein said indicating means comprises at least one LED light corresponding to each of said at least one brake temperature detection units.

25. A brake temperature detection unit according to claim 21 and wherein said control apparatus further comprises a black box device, said black box device comprising:
   a) a memory storage device coupled to said a processing unit;
   b) a processor connected to said memory storage device; and
   c) a recording device connected to said processor.

26. A brake temperature detection unit according to claim 15 and further comprising a cleaning unit.

27. A method for detecting an increase in temperature in a vehicle brake assembly having a brake temperature detection unit fitted thereto, said method comprising the steps of:
   determining the ambient temperature of said detection unit, said detection unit comprising:
      at least one sensor for detecting radiation from said corresponding brake assembly; and
      a mirror shutter unit pivotally fitted to said brake temperature detection unit;
   determining the temperature of a heat source within said detecting unit, said detecting unit being sealed from any radiation from said brake assembly;
   recording the temperature of said brake assembly;
   comparing the recorded brake assembly temperature with the determined heat source temperature; and
   indicating an alarm if said recorded brake assembly temperature exceeds a pre-determined temperature.

28. A method according to claim 27 wherein said pre-determined temperature is equal to said determined heat source temperature.

* * * * *

UNITED STATES PATENT AND TRADEMARK OFFICE
CERTIFICATE OF CORRECTION

| | |
|---|---|
| PATENT NO. | : 6,310,545 B1 |
| DATED | : October 30, 2001 |
| INVENTOR(S) | : Sapir, Abraham |

Page 1 of 1

It is certified that error appears in the above-identified patent and that said Letters Patent is hereby corrected as shown below:

<u>Title page,</u>
Assignee: OPGAL OPTRONIC INDUSTRIES LTD., Karmiel (IL)

Signed and Sealed this

Nineteenth Day of March, 2002

Attest:

JAMES E. ROGAN
*Director of the United States Patent and Trademark Office*

*Attesting Officer*